May 15, 1962
A. F. LEATHERMAN
3,035,143
CONTROL DEVICE
Filed May 25, 1959
2 Sheets-Sheet 1
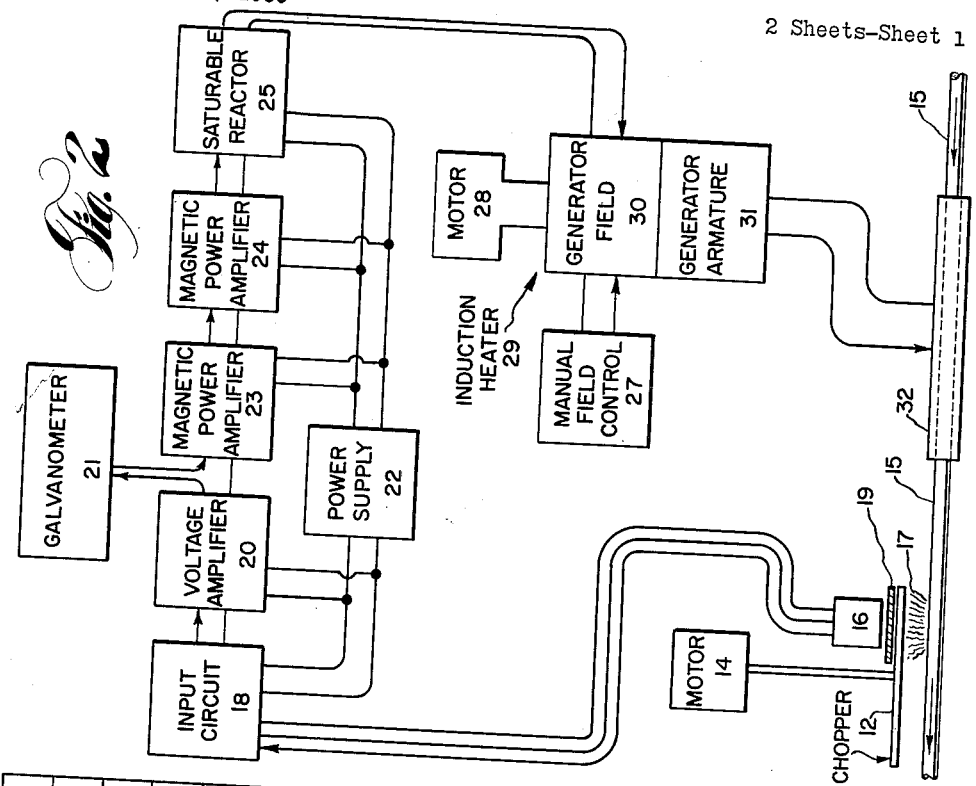
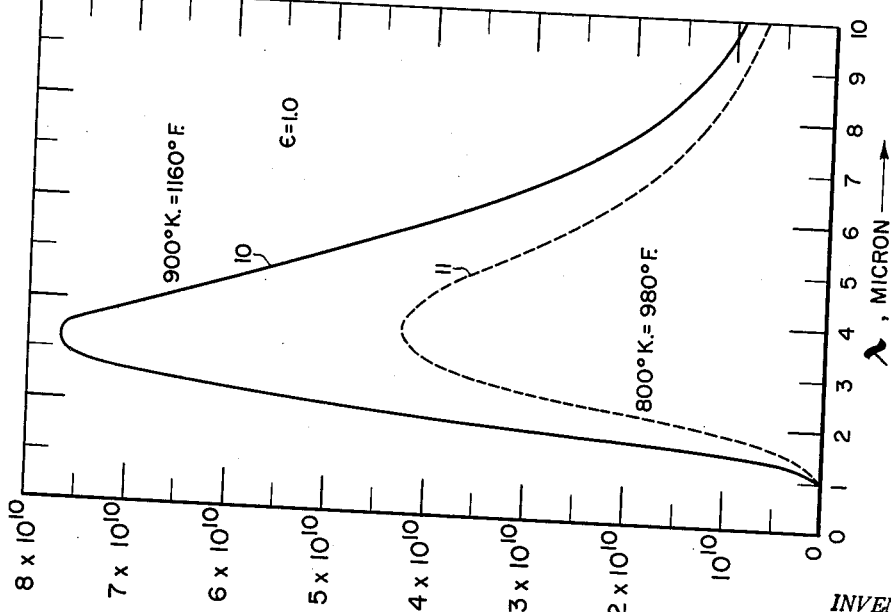
INVENTOR.
ALFRED F. LEATHERMAN
BY Hoopes Leonard & Buell
ATTORNEYS

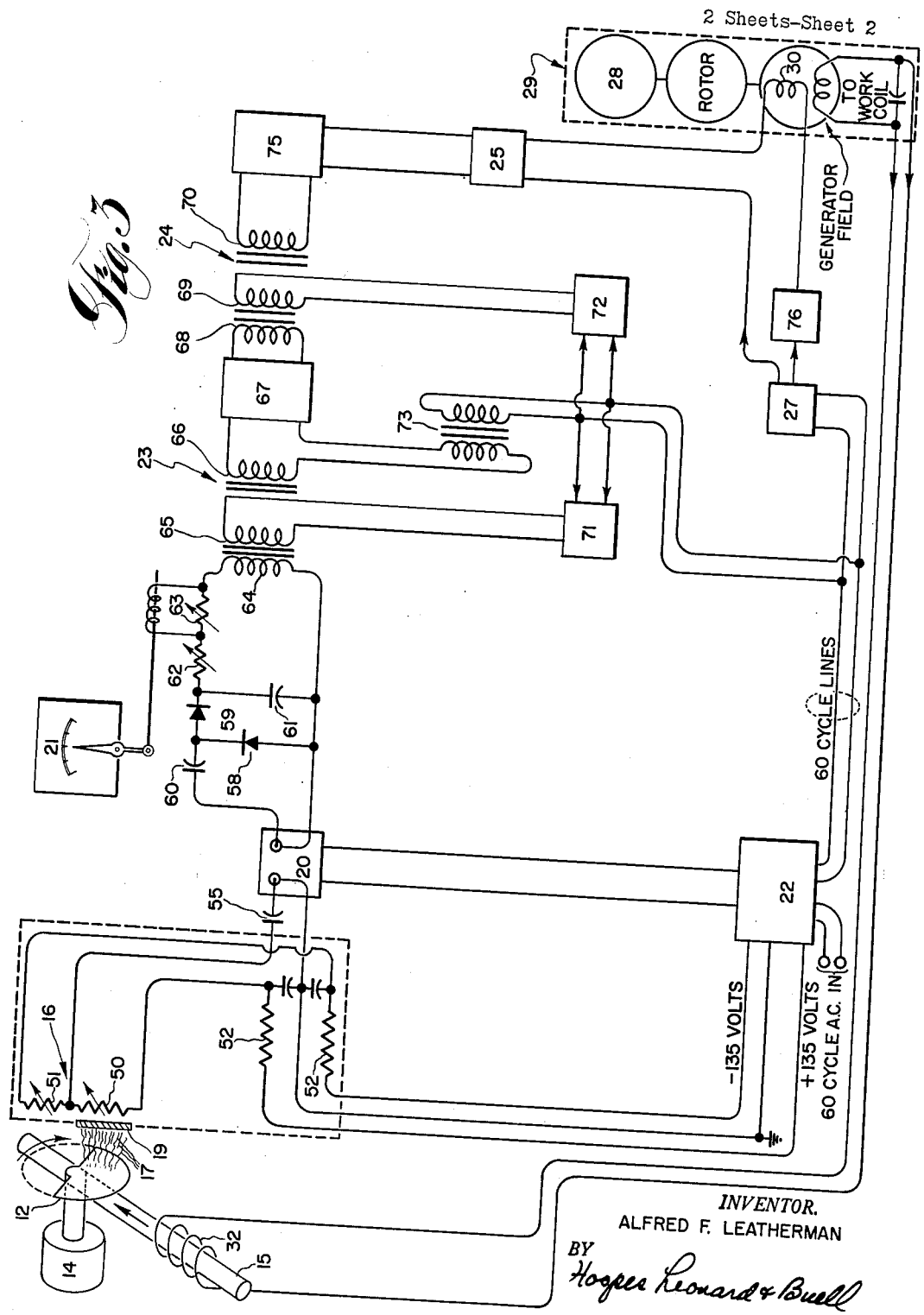

United States Patent Office 3,035,143
Patented May 15, 1962

3,035,143
CONTROL DEVICE
Alfred F. Leatherman, Columbus, Ohio, assignor, by mesne assignments, to Copperweld Steel Company, Pittsburgh, Pa., a corporation of Pennsylvania
Filed May 25, 1959, Ser. No. 815,622
4 Claims. (Cl. 219—10.77)

This invention relates to control devices and, more particularly, to a pyrometer-controller-type device for use where both radiation detection and power control are required. In particular, the instrument of this invention may be used in connection with the control of heating in the process described in the copending application of R. M. Noethlich, Jr., et al., Serial No. 773,125, for the manufacture of concentric bimetallic rod, wherein a cladding metal, initially powder, is applied to an inner core of a second metal. In the process there described, induction heating is used in connection with the bonding of the cladding metal to the core. In such an operation, the sensing-controller device senses the temperature of a moving induction-heated bimetallic rod and, at the same time, controls the power output of the induction heater to maintain a substantially constant rod temperature. In other applications involving either moving or stationary work, such devices could be used as sensing devices only, or as sensing and control devices.

Many prior art devices, such as direct or indirect thermocouples, thermopiles, and phototubes, could not be used in such applications for various reasons, such as frictional wear on detecting components, defacing of the rod by the detecting component, poor speed of response, inaccuracies due to variable heat transfer from rod to detector, variable ambient temperatures and irregular drafts, variation in rod speed, variation of surface or other condition of the rod, etc. Photocells, in general, do not have response in the proper wave length, are not sensitive enough, are too delicate, or are subject to electrical pickup. Commercial thermopile pyrometers are not satisfactory because the low thermal emissivity of the rod surface combined with a relatively low temperature (1000° F.) results in a radiated energy too small for satisfactory operation of such thermopiles.

It is, therefore, an object of this invention to provide a sensing-detecting device capable of responding to low-level radiated energy.

It is a further object of this invention to provide a device which will not mar or deface, or be marred by or defaced by, a moving surface whose temperature is to be detected and controlled.

Still another object of this invention is to provide such a device which responds rapidly to changes in the condition to be controlled.

Yet another object is to provide such a device capable of operation even at high work temperatures or in high ambient temperatures.

Another object of the present invention is to provide a device capable of detecting and controlling temperatures of either liquid or solid surfaces.

Other objects and advantages of the present invention will be apparent in view of the following detailed description thereof, when read in conjunction with the attached drawings wherein FIG. 1 is a theoretical plot of radiated energy emitted over the range of wave lengths from 1 to 10 microns by a theoretical body from which the maximum possible energy is emitted;

FIG. 2 is a schematic block diagram of the device of the present invention; and

FIG. 3 is a further schematic diagram showing more detail in respect to the critical elements of the present device.

In general, the device of the present invention comprises a detector sensitive to thermal radiation over a wave length range of from about 1 to about 10 microns, which detector converts said intercepted energy into an electrical signal, an amplifier, and a control device responsive to the output of the amplifier.

Referring now more particularly to the drawings, it is seen that:

FIG. 1 is a plot showing the distribution of radiation energy emitted over the range of wave lengths from 1 to 10 microns, by a theoretical body in which the maximum possible energy is emitted at all wave lengths. Curve 10 represents a plot for a temperature of 1160° F., curve 11 a plot for a temperature of 980° F. The plot serves to illustrate that the energy emitted over the range from 1 to 10 microns represents a substantial portion of the total radiation emitted.

FIG. 2 shows, in a combination of schematic representations and block diagrams, the elements of the present device. Radiation (shown schematically at 17) from work piece 15, is intercepted by a detector device comprising chopper 12, window 19, and bolometer cell 16. Cell 16 and input circuit 18 convert the signal received by cell 16 through chopper 12 and window 19 into a voltage signal which is fed to voltage amplifier 20, the output of which is, in turn, fed to two magnetic amplifier stages 23 and 24, where the power signal is increased until it is large enough to drive the saturable reactor 25. Saturable reactor 25 controls the A.-C. supply to the field winding 30 of induction heater 29. Variation of this field current changes the output of induction heater 29 and the heating action of coil 32, thereby, in turn, controlling the temperature of work piece 15 which is heated by passing through coil 32. Also illustrated in FIG. 2 are a power supply 22 for the amplifiers and a galvanometer 21 which may be connected in the circuit as shown to indicate the temperature of the work piece 15.

FIG. 3 shows a preferred arrangement of circuit elements for the present device. Various elements are shown in considerably more detail than in FIG. 2. Motor 14 and chopper 12 are again shown schematically in relation to work piece 15 which is heated by passing through coil 32. It will be seen that the bolometer 16 will receive "chopped" infrared radiation (illustrated as waves 17) through window 19 from heated rod 15. Bolometer 16, as shown, consists of two series-connected flakes of thermistor material 50 and 51 supplied with filtered D.-C. power, for example, as shown, from a power supply 22. Bypassed resistors 52—52 are provided as shown. A voltage amplifier 20 is connected to receive the A.-C. signal generated by cell 16 through capacitor 55. The output voltage of the amplifier 20 is rectified by a doubler circuit indicated generally as 56 and comprising diodes 58 and 59, capacitors 60 and 61 and resistors 62 and 63. A galvanometer-type indicator 21 and the control winding 64 and two magnetic amplifier stages 23 and 24 complete the elements shown in FIG. 3. Stage 23 comprises windings 64, 65, and 66, while stage 24 comprises windings 68, 69, and 70. The output of each stage is rectified by elements 67 and 75, respectively. The output of the second stage 24 is applied to saturable reactor 25 which acts to vary the A.-C. supplied to field rectifier 76 of the induction-heating generator 29. Miscellaneous control and adjustment devices, such as bias supplies 71 and 72, stepdown transformer 73 and variac 27 are also illustrated in FIG. 3.

The operation of the device can best be described by referring to FIG. 3. Work piece 15, a rod whose temperature is to be controlled, passes through coil 32, a heating coil energized by induction heater 29, shown schematically as comprising motor 28, a rotor, and a field coil 30. Motor 14 drives chopper 12 so that in subsequent intervals of time a part of the infrared radiation 17 from rod 15 is intercepted while in the next interval a portion passes through window 19 to the detector or bolometer cell 16. In practice, window 19 has been composed of arsenic trisulfide glass which is essentially transparent to infrared radiation between about 1 and 10 microns. The window limits the radiation to these limits and serves essentially as a protective covering for bolometer cell 16. One flake 50 of this cell 16 is exposed to the "chopped" radiation 17, while the other flage 51 is not exposed to the radiation. In practice, flakes 50 and 51 have been electronic semiconductors composed of mixtures of oxides of manganese, nickel and cobalt. The impinging infrared radiation causes flake 50 to change in temperature and, consequently, to change in electrical resistance. As the temperature increases, the electrical resistance of flake 50 of thermistor material decreases. These changes occur in subsequent intervals of time at the rate of the chopping action, limited by the thermal characteristics of cell 16. Flake 51, which is not exposed to radiation 17, forms with flake 50 a bridge circuit to compensate for ambient temperature changes. Bypassed resistors 52—52 serve to limit D.-C. cell current under conditions of high ambient temperatures. The chopping frequency is chosen to be low enough so that detecting cell 16 can follow the fluctuation of infrared energy received through the chopper 12, but high enough so that no special low-frequency techniques are required in the design and construction of the amplifier. A chopping frequency of about 13 c.p.s. is a good operating frequency. A 13 cycle A.-C. voltage will thus be generated by cell 16.

The A.-C. signal generated by cell 16 is fed to amplifier 20 through capacitor 55. A standard amplifier having a gain of about 1000 and a band width of between 3 db points at 0.8 and 50 c.p.s. has been used satisfactorily. These particular characteristics are not critical. The output of the amplifier 20 is rectifier to provide a D.-C. signal related to the temperature of the work piece 15. This rectification is accomplished by a doubler circuit, indicated generally as 56, and including capacitors 60 and 61 selected to have values providing voltage doubling, filtering action, and time delay. Time delay is important to avoid oscillation of the controller system. Adjustment of the sensitivity of the circuit and of the scale factor of the galvanometer indicator 21 is provided by resistors 62 and 63. Other control functions, such as "proportional band" adjustment, "reset," and "rate time" could be built in to the circuit by well-known circuit element alterations or additions.

The D.-C. signal is next fed to two magnetic amplifier stages 23 and 24, where the power is increased to the point where it is sufficient to drive saturable reactor 25. Also, the magnetic amplifier stages are connected so that they reverse the signal, thus providing to saturable reactor 25 a D.-C. which varies inversely with the temperature of the work piece 15. This reversal is accomplished simply by reversing the normal input polarity of control winding 68 of the second magnetic amplifier stage 24.

The control point of the system, that is the temperature at which the error signal is minimum, may be adjusted by varying the magnitude and polarity of the bias current to the second magnetic amplifier. In the device shown the two magnetic amplifier stages operate with an input of about 500 microamperes D.-C. and provide an output of about 20 volts and 50 milliamperes to the input of saturable reactor 25. The reactor is set for an output of about 1.5 kva. Of course, none of these values is critical but may be adjusted depending upon the particular equipment used. For example, any reactor or amplifier which will operate with an input of about 40 milliamperes D.-C. and produce about 40 volts and 6 to 7 amperes D.-C. output should work for the amplifier stage.

As is shown in the drawings, the saturable reactor 25 controls the alternating current supply to the field winding 30 of the motor-generator-type induction heater 29. Variation of the field current, in turn, changes the output of the induction heater 29 and thus controls the heating action of work coil 32. A controller system such as has been described here has been found operative in controlling the 150 kilowatt output of a 3000 cycle induction heater. In practice, as the temperature of work piece 15 increases, the D.-C. signal to saturable reactor 25 decreases, whereupon the saturable reactor 25 decreases the current in generator field 30. This, in turn, reduces the output of induction heater 29, thus decreasing the heating action of work coil 32, thus reducing the temperature of work piece 15. If the temperature of work piece 15 decreases beyond the control point, the reverse series of adjustments occurs, thus eventually restoring the control temperature. In connection with induction heater 29, the 60-cycle voltage voltage supply for the generator field 30 may either be within the generator as shown, or may be supplied separately through an A.-C. voltage regulator. The latter arrangement will provide additional stability in the system.

It will be apparent that a new and useful control system has been hereinabove described. Although described in connection with a system for maintaining control of the temperature of a rod being heated in an induction coil, it will be apparent that the system is not limited to that specific application. Also, various specific elements disclosed and described may be replaced by equivalent elements without departing from the scope of the present invention.

What is claimed is:

1. A control device for controlling the temperature of a rod or wire passing through an induction heating coil in a continuous process, said device comprising a thermistor detector sensitive to thermal radiations in the wave-length range of from about 1 to about 10 microns emanating from said rod or wire, a chopper device located intermediate said detector and said rod or wire, a window transparent to radiations of wave lengths between about 1 and about 10 microns said window being located between said chopper device and said detector, circuit elements forming part of said detector and capable of converting said thermal radiations to electrical signals, an amplifier to amplify said electrical signals, said amplifier including means for reversing the signal so that it varies inversely with the temperature of the rod or wire, a saturable reactor connected to the output of said amplifier, the output of said saturable reactor connected to control the field current of an induction heater to, in turn, control the heating action of said induction heating coil through which the rod passes.

2. A device as described in claim 1 wherein the window is made of arsenic trisulfide.

3. A control device as set forth in claim 1 in which said rod or wire comprises aluminum cladding and a ferrous core, and said induction heating coil operates at an output and frequency sufficient to heat the interface between said cladding and core substantially to bonding temperature.

4. A control device for controlling the temperature produced in a work piece in a continuous process by heating means, said work piece being a rod or wire comprising a powder metal cladding and a solid metal core, said heating means having an induction heating coil which operates at an output and frequency sufficient to heat the interface between said cladding and core substantially to bonding temperature, said device comprising a detector sensitive to thermal radiation from said work piece, a chopper device located so as to periodically intercept said radiation before it reaches said detector, an amplifier which receives and amplifies the alternating signal generated by the detector in response to said thermal radiation received between interceptions, and an electrical control circuit responsive to said amplified signal to regulate said heating means acting upon said work piece to control said temperature.

References Cited in the file of this patent

UNITED STATES PATENTS

| | | |
|---|---|---|
| 2,404,147 | Strickland | July 16, 1946 |
| 2,438,160 | Green | Mar. 23, 1948 |
| 2,521,880 | Storm | Sept. 12, 1950 |
| 2,687,611 | Larsen | Aug. 31, 1954 |
| 2,785,860 | Harrison et al. | Mar. 19, 1957 |
| 2,813,186 | Bock | Nov. 12, 1957 |
| 2,829,229 | Metz | Apr. 1, 1958 |
| 2,948,799 | Weise | Aug. 9, 1960 |

UNITED STATES PATENT OFFICE
CERTIFICATE OF CORRECTION

Patent No. 3,035,143  
May 15, 1962

Alfred F. Leatherman

It is hereby certified that error appears in the above numbered patent requiring correction and that the said Letters Patent should read as corrected below.

Column 3, line 54, for "rectifier" read -- rectified --; column 4, line 33, strike out "voltage", second occurrence.

Signed and sealed this 4th day of September 1962.

(SEAL)  
Attest:

ERNEST W. SWIDER  
Attesting Officer

DAVID L. LADD  
Commissioner of Patents